United States Patent
Bai et al.

(10) Patent No.: US 12,132,546 B2
(45) Date of Patent: Oct. 29, 2024

(54) BEAM GROUP BASED CHANNEL STATE INFORMATION REPORTING

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/302,746

(22) Filed: May 11, 2021

(65) Prior Publication Data
US 2022/0368395 A1    Nov. 17, 2022

(51) Int. Cl.
*H04B 7/06* (2006.01)
*H04L 5/00* (2006.01)
*H04L 41/0677* (2022.01)

(52) U.S. Cl.
CPC ......... *H04B 7/0626* (2013.01); *H04L 5/0048* (2013.01); *H04L 41/0677* (2013.01)

(58) Field of Classification Search
CPC ...... H04B 7/0626; H04B 7/024; H04B 7/088; H04B 7/0695; H04L 5/0048; H04L 41/0677; H04L 5/0051
See application file for complete search history.

(56) References Cited

U.S. PATENT DOCUMENTS

2020/0059290 A1* 2/2020 Pan ...................... H04W 24/10
2021/0359745 A1* 11/2021 Farag .................. H04B 7/0626
2023/0084460 A1* 3/2023 Gao ..................... H04L 5/0094

FOREIGN PATENT DOCUMENTS

WO    WO-2022152832 A1 *  7/2022

OTHER PUBLICATIONS

Onggosanusi et al., Modular and High-Resolution Channel State Information and Beam Management for 5G New Radio, Mar. 2018, IEEE Communications Magazine, Key Technologies for 5G New Radio (Year: 2018).*
Li et al., Beam Management in Millimeter-Wave Communications for 5G and Beyond, Dec. 2019, IEEE Access, Special Selection on Millimeter-Wave Communications: New Research Trends and Challenges, vol. 8 (Year: 2019).*

(Continued)

*Primary Examiner* — Justin T Van Roie
(74) *Attorney, Agent, or Firm* — Harrity & Harrity, LLP

(57) ABSTRACT

Various aspects of the present disclosure generally relate to wireless communication. In some aspects, a user equipment (UE) may receive channel state information (CSI) measurement resource (CMR) configurations for a first set of reference signals indicated to be associated with a first beam group and a second set of reference signals indicated to be associated with a second beam group. The UE may transmit a CSI report indicating a set of beams that includes a first beam associated with the first beam group and a second beam associated with the second beam group. Numerous other aspects are described.

30 Claims, 8 Drawing Sheets

(56) References Cited

OTHER PUBLICATIONS

Intel Corporation: "Details for DL Beam Management", 3GPP Draft; R1-1710526 Details for DL Beam Management , 3rd Generation Partnership Project (3GPP), Mobile Competence Centre, 650, Route Des Lucioles ; F-06921 Sophia-Antipolis Cedex, France, vol. RAN WG1, No. Qingdao. China; Jun. 27, 2017-Jun. 30, 2017, Jun. 26, 2017 (Jun. 26, 2017), pp. 1-13, XP051299733.
International Search Report and Written Opinion—PCT/US2022/071964—ISA/EPO—Aug. 10, 2022.
Moderator (CATT): "Summary on Beam Management for Simultaneous Multi-TRP Transmission with Multiple Rx Panels", 3GPP TSG RAN WG1 Meeting #103-e , R1-2009500 (R1-200nnnn), 3rd Generation Partnership Project, Mobile Competence Centre, 650, Route Des Lucioles, F-06921 Sophia-Antipolis Cedex France, vol. RAN WG1, No. e-Meeting, Oct. 26, 2020-Nov. 13, 2020 Nov. 26, 2020, XP051960786, 40 Pages, Section 2.1 and Section 3.1.
Samsung: "Remaining Details on UE Group Based Beam Reporting", 3GPP TSG RAN WG1 Meeting #90bis, R1-1720301, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 17, 2017, XP051368950, 3 Pages.

\* cited by examiner

BEAM GROUP BASED CHANNEL STATE INFORMATION REPORTING

FIELD OF THE DISCLOSURE

Aspects of the present disclosure generally relate to wireless communication and to techniques and apparatuses for beam group based channel state information reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving channel state information (CSI) measurement resource (CMR) configurations for a first set of reference signals indicated to be associated with a first beam group and a second set of reference signals indicated to be associated with a second beam group; and transmitting a CSI report indicating a set of beams that includes a first beam associated with the first beam group and a second beam associated with the second beam group.

In some aspects, a method of wireless communication performed by a base station includes transmitting CMR configurations for a first set of reference signals indicated to be associated with a first beam group and a second set of reference signals indicated to be associated with a second beam group; and receiving a CSI report indicating a set of beams that includes a first beam associated with the first beam group and a second beam associated with the second beam group.

In some aspects, a UE for wireless communication includes a memory; and one or more processors, coupled to the memory, configured to: receive CMR configurations for a first set of reference signals indicated to be associated with a first beam group and a second set of reference signals indicated to be associated with a second beam group; and transmit a CSI report indicating a set of beams that includes a first beam associated with the first beam group and a second beam associated with the second beam group.

In some aspects, a base station for wireless communication includes a memory; and one or more processors, coupled to the memory, configured to: transmit CMR configurations for a first set of reference signals indicated to be associated with a first beam group and a second set of reference signals indicated to be associated with a second beam group; and receive a CSI report indicating a set of beams that includes a first beam associated with the first beam group and a second beam associated with the second beam group.

In some aspects, a non-transitory computer-readable medium storing a set of instructions for wireless communication includes one or more instructions that, when executed by one or more processors of a UE, cause the UE to: receive CMR configurations for a first set of reference signals indicated to be associated with a first beam group and a second set of reference signals indicated to be associated with a second beam group; and transmit a CSI report indicating a set of beams that includes a first beam associated with the first beam group and a second beam associated with the second beam group.

In some aspects, a non-transitory computer-readable medium storing a set of instructions for wireless communication includes one or more instructions that, when executed by one or more processors of a base station, cause the base station to: transmit CMR configurations for a first set of reference signals indicated to be associated with a first beam group and a second set of reference signals indicated to be associated with a second beam group; and receive a CSI report indicating a set of beams that includes a first beam associated with the first beam group and a second beam associated with the second beam group.

In some aspects, an apparatus for wireless communication includes means for receiving CMR configurations for a first set of reference signals indicated to be associated with a first beam group and a second set of reference signals indicated to be associated with a second beam group; and means for transmitting a CSI report indicating a set of beams that includes a first beam associated with the first beam group and a second beam associated with the second beam group.

In some aspects, an apparatus for wireless communication includes means for transmitting CMR configurations for a first set of reference signals indicated to be associated with a first beam group and a second set of reference signals indicated to be associated with a second beam group; and means for receiving a CSI report indicating a set of beams that includes a first beam associated with the first beam group and a second beam associated with the second beam group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
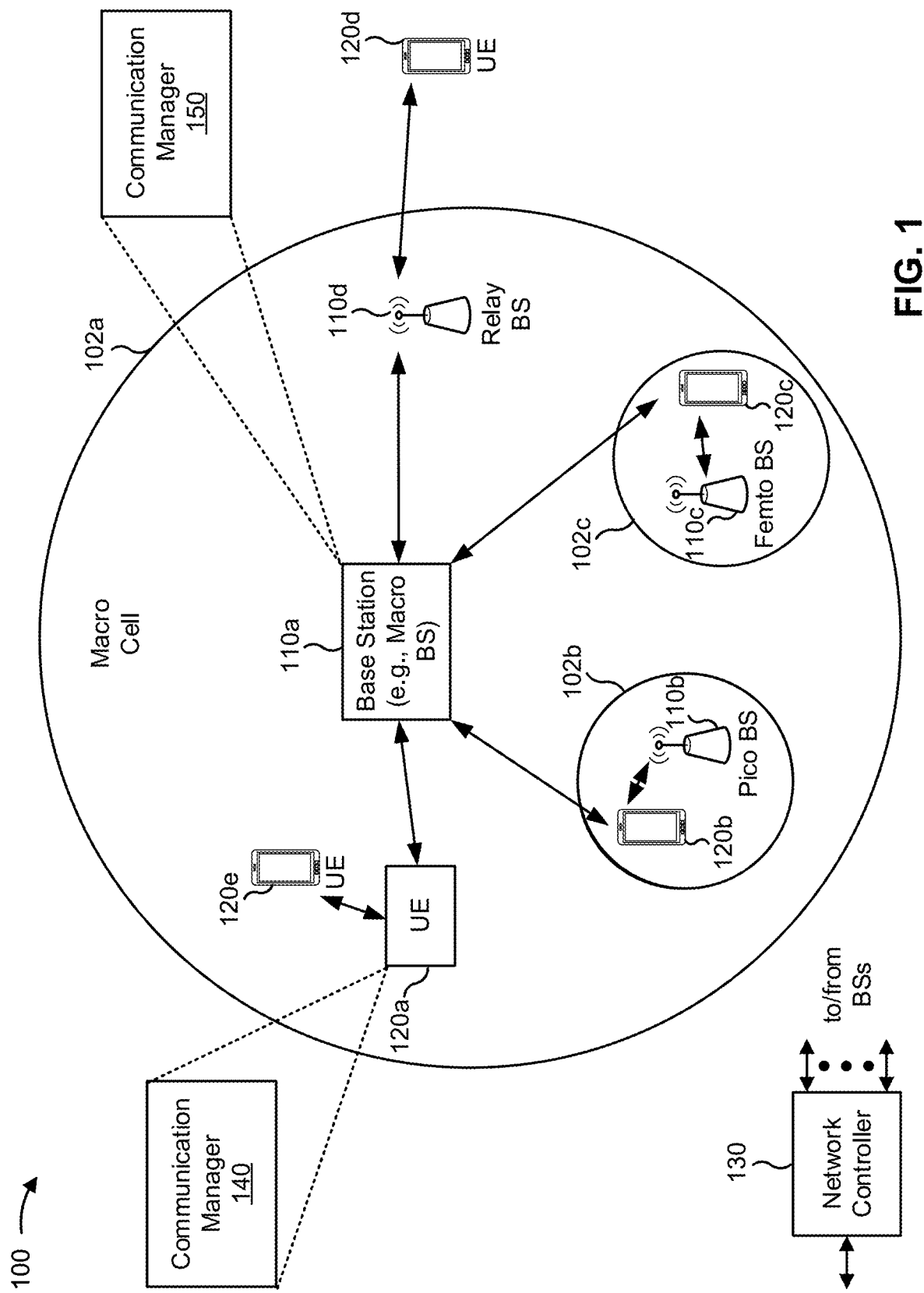
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive CMR configurations for a first set of reference signals indicated to be associated with a first beam group and a second set of reference signals indicated to be associated with a second beam group; and transmit a CSI report indicating a set of beams that includes a first beam associated with the first beam group and a second beam associated with the second beam group. Additionally, or alternatively, the communication manager 140 may perform one or more other operations described herein.

In some aspects, the base station 110 may include a communication manager 150. As described in more detail elsewhere herein, the communication manager 150 may transmit CMR configurations for a first set of reference signals indicated to be associated with a first beam group and a second set of reference signals indicated to be associated with a second beam group; and receive a CSI report indicating a set of beams that includes a first beam associated with the first beam group and a second beam associated with the second beam group. Additionally, or alternatively, the communication manager 150 may perform one or more other operations described herein.

As indicated above, FIG. 1 is provided as an example. Other examples may differ from what is described with regard to FIG. 1.

Figure 2:
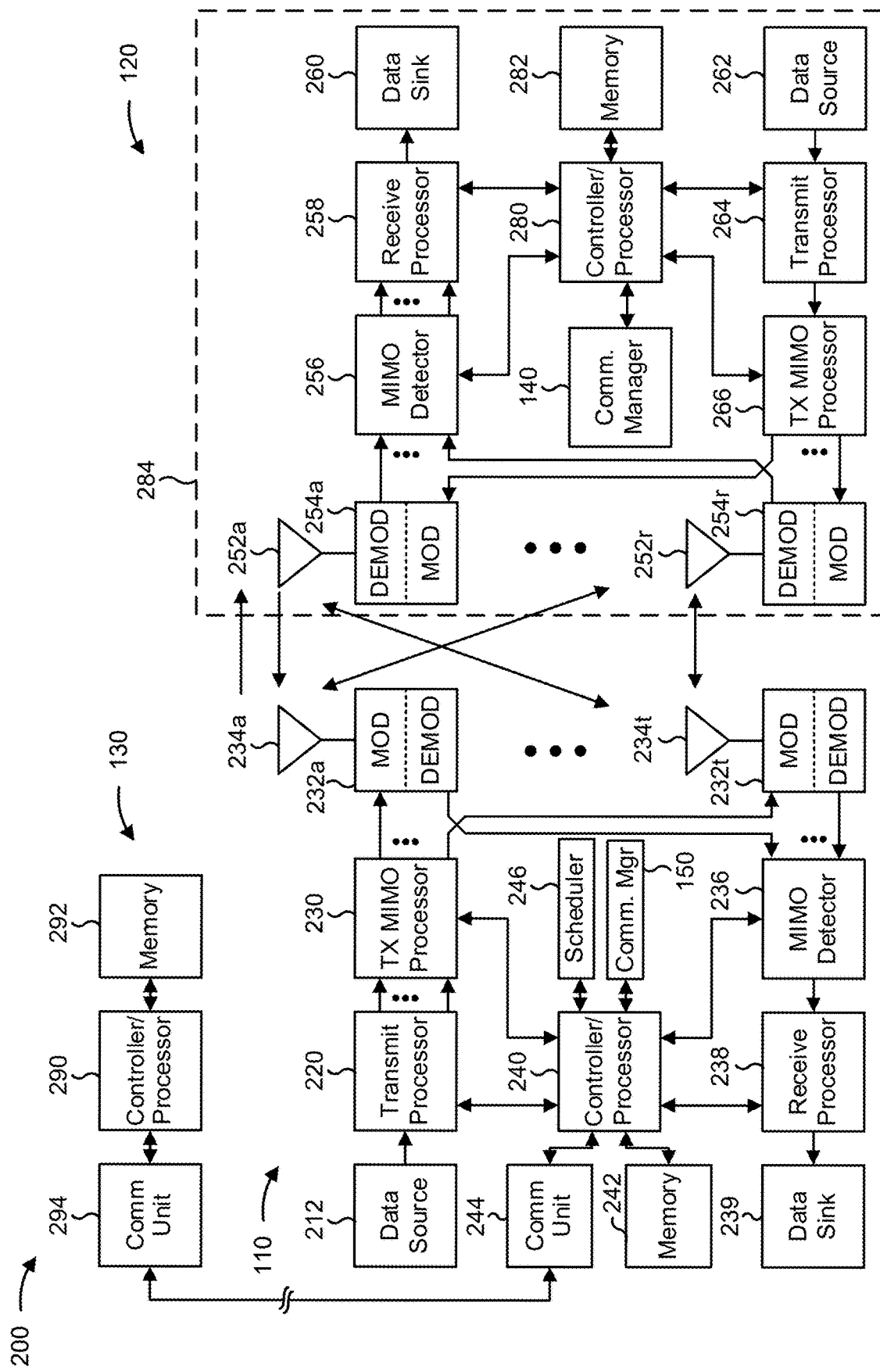
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate with network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6.

Controller/processor 240 of base station 110, controller/processor 280 of UE 120, and/or any other component(s) of FIG. 2 may perform one or more techniques associated with beam group based channel state information reporting, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving CMR configurations for a first set of reference signals indicated to be associated with a first beam group and a second set of reference signals indicated to be associated with a second beam group; and/or means for transmitting a CSI report indicating a set of beams that includes a first beam associated with the first beam group and a second beam associated with the second beam group. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for transmitting CMR configurations for a first set of reference signals indicated to be associated with a first beam group and a second set of reference signals indicated to be associated with a second beam group; and/or means for receiving a CSI report indicating a set of beams that includes a first beam associated with the first beam group and a second beam associated with the second beam group. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
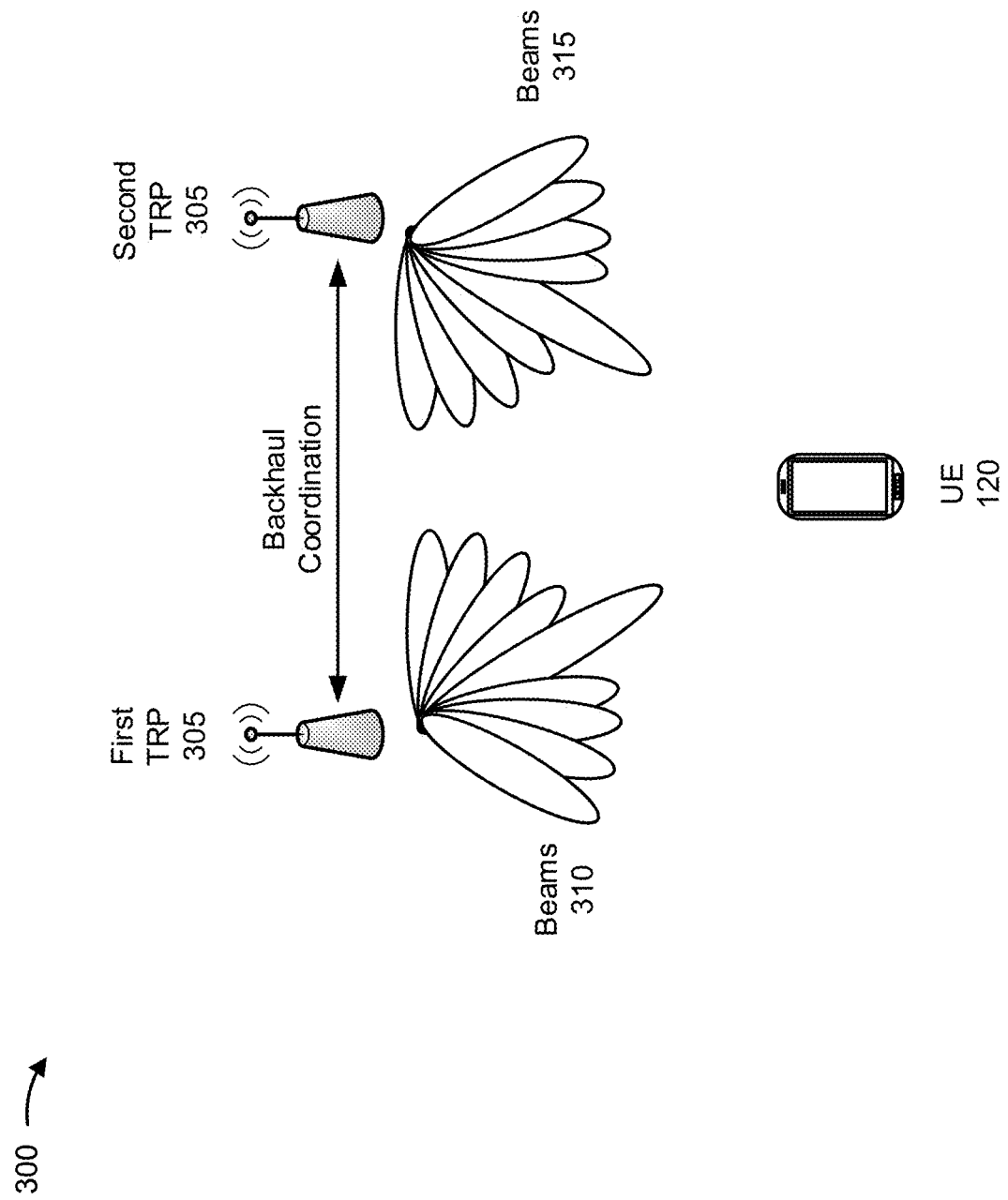
FIG. 3 is a diagram illustrating an example of, in accordance with the present disclosure.

FIG. 3 is a diagram illustrating an example 300 of measuring beams from multiple TRPs, in accordance with the present disclosure. As shown in FIG. 3, multiple TRPs 305 may communicate with the same UE 120. In some networks, the UE 120 may receive communications from multiple TRPs simultaneously. The multiple TRPs may be associate with a same cell and/or a same base station (e.g., base station 110).

The multiple TRPs 305 (shown as first TRP and second TRP) may communicate with the same UE 120 in a coordinated manner (e.g., using coordinated multipoint transmissions) to improve reliability (e.g., via spatial diversity) and/or increase throughput. The multiple TRPs 305 may coordinate such communications via an interface between the multiple TRPs 305 (e.g., a backhaul interface and/or an access node controller). The interface may have a smaller delay and/or higher capacity when the TRPs 305 are co-located at the same base station (e.g., when the TRPs 305 are different antenna arrays or panels of the same base station), and may have a larger delay and/or lower capacity (as compared to co-location) when the TRPs 305 are located at different base stations. The different TRPs 305 may communicate with the UE 120 using different quasi-co-location (QCL) relationships (e.g., different transmission configuration indicator (TCI) states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 305 (e.g., the first TRP and the second TRP) may transmit communications to the UE 120 on the same PDSCH. For example, a communication may be transmitted using a single codeword with different spatial layers for different TRPs 305 (e.g., where one codeword maps to a first set of layers transmitted by a first TRP 305 and maps to a second set of layers transmitted by a second TRP 305). As another example, a communication may be transmitted using multiple codewords, where different codewords are transmitted by different TRPs 305 (e.g., using different sets of layers). In either case, different TRPs 305 may use different QCL relationships (e.g., different TCI states) for different DMRS ports corresponding to different layers. For example, a first TRP 305 may use a first QCL relationship or a first TCI state for a first set of DMRS ports corresponding to a first set of layers, and a second TRP 305 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 305, and a second PDCCH may schedule a second codeword to be transmitted by a second TRP 305. Furthermore, first DCI (e.g., transmitted by the first TRP 305) may schedule a first PDSCH communication associated with a first set of DMRS ports with a first QCL relationship (e.g., indicated by a first TCI state) for the first TRP 305, and second DCI (e.g., transmitted by the second TRP 305) may schedule a second PDSCH communication associated with a second set of DMRS ports with a second QCL relationship (e.g., indicated by a second TCI state) for the second TRP 305. In this case, DCI (e.g., having DCI format 1_0 or DCI format 1_1) may indicate a corresponding TCI state for a TRP 305 corresponding to the DCI. The TCI field of a DCI indicates the corresponding TCI state (e.g., the TCI field of the first DCI indicates the first TCI state and the TCI field of the second DCI indicates the second TCI state).

The multiple TRPs 305 and/or the base station may use reference signals (e.g., as part of a beam management process) to determine which beams to use for the downlink data communications. For example, the base station may transmit, via the multiple TRPs 305, reference signals via different beams. The first TRP 305 may transmit reference signals via beams 310, and the second TRP 305 may transmit additional reference signals via beams 315. The UE 120 may receive and measure the reference signals via the beams 310 and 315 to determine one or more preferred beams for subsequent communications. The UE 120 may generate a CSI report that indicates a set of preferred beams (e.g., with an indication based at least in part on an associated reference signal) for the subsequent communications.

However, the UE may indicate multiple preferred beams from a same TRP of the multiple TRPs 305. In this way, the multiple preferred beams may have limited spatial diversity, which may negatively impact an ability to receive downlink communications via the multiple preferred beams simultaneously. For example, based at least in part on the base station using the multiple preferred beams for the same TRP, the UE may receive the downlink communications with an interference (e.g., measured by a signal-to-interference-plus-noise ratio (SINR)) that causes reception errors at the UE. Based at least in part on the reception errors, the UE and the base station may consume power, computing, network, and/or communication resources to detect and/or correct the reception errors. Additionally, or alternatively, the UE may receive the downlink communications with parameters (e.g., an MCS) that cause lower spectral efficiency than if the multiple preferred beams were associated with different TRPs having increased spatial diversity.

As indicated above, FIG. 3 is provided as an example. Other examples may differ from what is described with respect to FIG. 3.

In some aspects described herein, a UE may receive CMR configurations for a first set of reference signals that are indicated to be associated with a first beam group (e.g., associated with a first TRP) and for a second set of reference signals that are indicated to be associated with a second beam group (e.g., associated with a second TRP). The UE may be configured to indicate, in a CSI report, a set of beams (e.g., a set of preferred beams) that includes a first beam associated with the first beam group and a second beam associated with a second beam group.

In some aspects, the CMR configurations may explicitly indicate that the first set of reference signals are associated with the first beam group and/or that the second set of reference signals are associated with the second beam group. For example, the CMR configurations may indicate reference signals that are part of a CMR group, a CMR set, and/or a CMR subset of CMR resources. Each CMR resource (e.g., configured for a corresponding reference signal) may be associated with a synchronization signal block (SSB) or a CSI reference signal (CSI-RS) that is associated with a beam and/or a TCI state. The CMR may indicate associations between reference signals and beam groups using radio resource control (RRC) signaling (e.g., in RRC-based configurations of the CMR) with additional bits (e.g., to indicate a CMR group identification). The CMR may be periodically, semipersistently, or aperiodically configured, with which configuration the base station may indicate associations between reference signals and beam groups.

In some aspects, the CMR may indicate associations between reference signals and beam groups implicitly. For example, the reference signals configured by the CMR configurations may be associated with a TCI state that is associated with a control resource set (CORESET) pool identification.

The UE may measure reference signals corresponding to the CMR configurations and report, in a CSI report, one or more sets of beams. In each set of beams, the beams and/or associated reference signals may be associated with different beam groups.

In some aspects, the UE may determine an association of a beam group to a CSI resource index (CRI) and/or an SSB index (SSBI) based at least in part on configurations of beam failure recovery reference signals (BFD-RSs) and/or new beam identification reference signals (NBI-RSs). For example, the UE may receive (e.g., from the base station) configurations of BFD-RSs and/or NBI-RSs for each beam group (e.g., associated with a TRP). Indices of the BFD-RSs may be directly associated with indices of the NBI-RSs. For example, sets of the BFD-RSs may be associated with sets of NBI-RSs. The sets of the BFD-RSs may have 1-to-1 mapping with the sets of the NBI-RSs based at least in part on, for example, a mapping rule configured in a communication protocol and/or in configuration signaling from the base station. In some aspects, the base station may provide a configured association between the sets of the BFD-RSs and the sets of the NBI-RSs. The beams of the BFD-RSs and the NBI-RSs may be indicated via a CRI and/or an SSBI, and the UE may determine the association of the beams group to the CRI and/or the SSBI based at least in part on the BFD-RS and the NBI-RS configurations. In some aspects, a maximum number of RSs per set of BFD-RSs may be configured in a communication protocol or may be based at least in part on a UE capability (e.g., any number between 1 and a maximum number defined, for example, in the communication protocol).

In some aspects, the CSI report may include a reference signal index (e.g., an SSB index and/or a CSI-RS resource identification) to indicate beams of the one or more sets of beams. The reference signal index of a reference signal may be based at least in part on an index that includes multiple beam groups or may be based at least in part on an index within a beam group that is associated with the reference signal. When indicating the reference signal index based at least in part on an index within the beam group, each beam may be indicated using a same bitwidth or different bitwidths. For example, each beam may be indicate using a same bitwidth based at least in part on each beam group having a same number of beams, or based at least in part on the each bitwidth being large enough to indicate a beam within a largest group (e.g., having a largest number of beams), among other examples. Alternatively, a beam may be indicated within each beam group based at least in part on a number of beams within respective beam groups (e.g., a beam group having 4 beams may be indicated with a bitwidth of 2 and a beam group having 5-8 beams may be indicated with a bitwidth of 3).

In some aspects, the UE may be configured to report a number N sets of beams in the CSI report. For example, the base station may indicate, in RRC signaling, that the UE is to include the number N sets of beams in the CSI report. In some aspects, the number N may be based at least in part on a capability of the UE (e.g., as reported by the UE to the base station). Based at least in part on measurements of the reference signals, the UE may always report N sets of beams regardless of qualities of the beams (e.g., as measured with RSRP and/or SINR, among other example of conditions configured by the base station or determined by the UE based at least in part on UE capabilities). Alternatively, the UE may include only a number n sets of beams that satisfy configured conditions and/or metrics. In other words, the UE may include fewer than N sets of beams in the CSI report based at least in part on having an insufficient number of beams that satisfy one or more quality metrics to be reported. In some aspects, the UE may provide a dynamic indication of a number of beam groups in the CSI report. For example, the UE may indicate, in a field (e.g., a front-loaded field) a number of beam groups in the CSI report. Additionally, or alternatively, the UE may indicate, via a reserved index (e.g., all values of 1), that no beams are reported for a beam group field. In some aspects, the UE may indicate, using a front-loaded bit, whether a following field indicates a valid beam group.

Based at least in part on the UE being configured to determine (e.g., via explicit or implicit indications from the base station) beam groupings for reference signals, the UE may transmit a CSI report that indicates one or more sets of beams with each beam within a set of beams being associated with a different beam group. In this way, the base station may receive a CSI report that indicates one or more sets of beams that includes beams with spatial diversity, which may reduce interference among beams within a set of beams. The reduced interference among beams within the set of beams may reduce reception errors, which may conserve power, computing, network, and/or communication resources that the UE and/or the base station may have otherwise used to detect and/or correct the reception errors. Additionally, or alternatively, the UE may receive the downlink communications with parameters (e.g., an MCS) that cause improved spectral efficiency than if the multiple preferred beams were associated with different TRPs having reduced spatial diversity.

Figure 4:
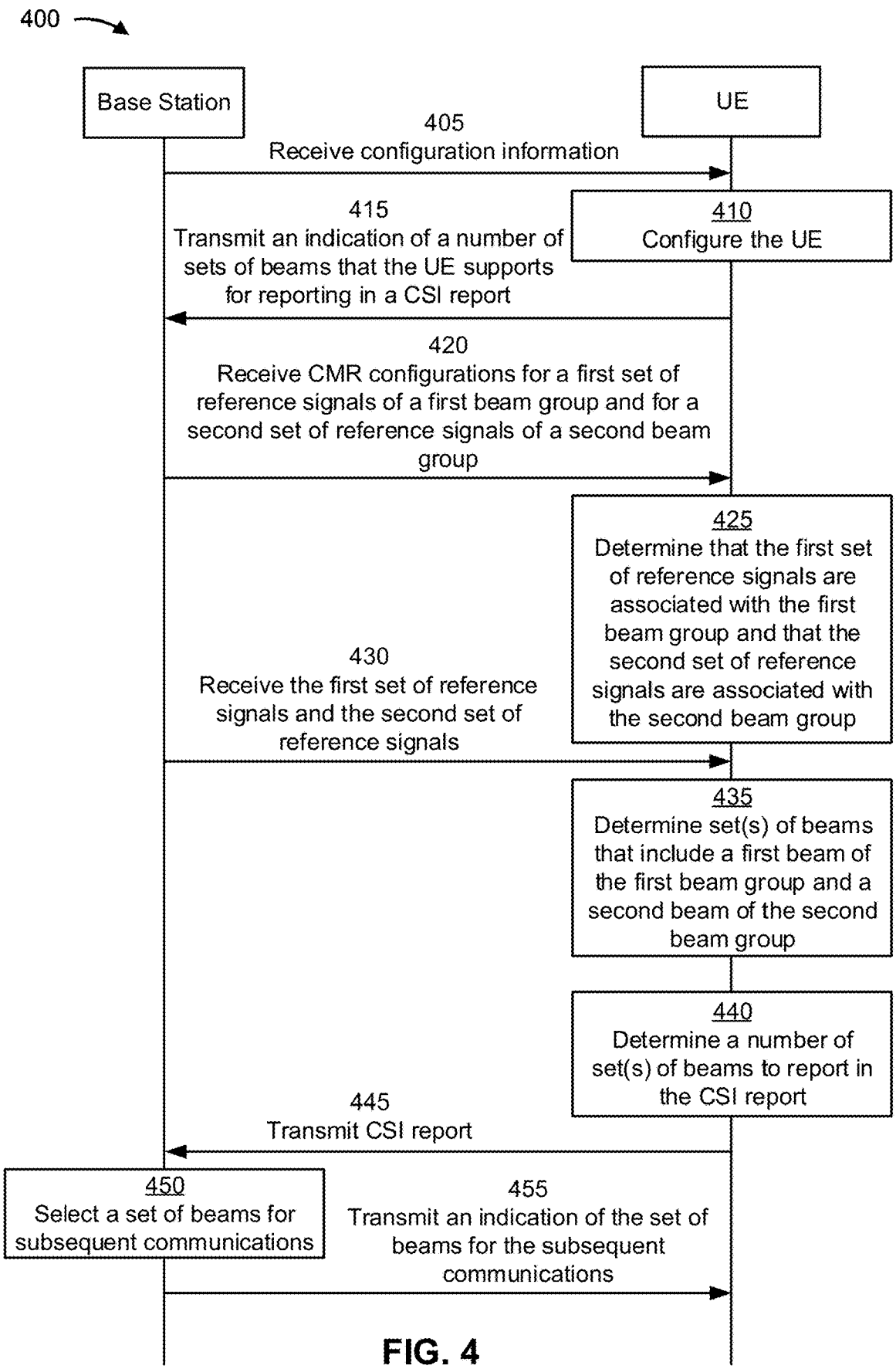
FIG. 4 is a diagram illustrating an example associated with beam group based channel state information reporting, in accordance with the present disclosure.

FIG. 4 is a diagram illustrating an example 400 associated with beam group based channel state information reporting, in accordance with the present disclosure. As shown in FIG. 4, a base station (e.g., base station 110) may communicate with a UE (e.g., UE 120). In some aspects, the base station and the UE may be part of a wireless network (e.g., wireless network 100). The base station may communicate with the UE via one or more TRPs (e.g., for downlink communications).

As shown by reference number 405, the base station may transmit, and the UE may receive, configuration information. In some aspects, the UE may receive the configuration information via one or more of RRC signaling, medium access control control elements (MAC CEs), and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of a number of sets of beams that the UE supports for reporting in a CSI report. In some aspects, the configuration information may indicate that the UE is to receive CMR configurations for a first set of reference signals indicated to be associated with a first beam group and for a second set of reference signals indicated to be associated with a second beam group. The configuration information may indicate that the UE is to select a single beam from the first beam group and a single beam from the second beam group to include in a set of beams reported to the base station. In some aspects, the configuration information may indicate that the UE is to determine a number of sets of beams to report in the CSI report based at least in part on an indicated number (e.g., received from the base station and/or indicated in a communication standard) and/or based at least in part on one or more quality metrics associated with beams of the first beam group and/or the second beam group. In some aspects, the configuration information may indicate a format for indicating the one or more sets of beams within the CSI report.

As shown by reference number 410, the UE may configure the UE based at least in part on the configuration information. In some aspects, the UE may be configured to perform one or more operations described herein based at least in part on the configuration information.

As shown by reference number 415, the UE may transmit, and the base station may receive, an indication of a number of sets of beams that the UE supports for reporting in a CSI report. In some aspects, the number of sets of beams that the UE supports for reporting in the CSI report may be based at least in part on capabilities of the UE. For example, the number may be based at least in part on capabilities to receive the reference signals and/or capabilities to process measurements of the reference signals to identify beams to report in a set of beams.

As shown by reference number 420, the UE may receive, and the base station may transmit, CMR configurations for a first set of reference signals of a first beam group and for a second set of reference signals of a second beam group. For example, the UE may receive CMR configurations for the first set of reference signals indicated to be associated with the first beam group and the second set of reference signals indicated to be associated with the second beam group. In some aspects, the first beam group may be associated with a first TRP, and the second beam group may be associated with a second TRP. Additionally, or alternatively, the first beam group may include beams that cause interference or otherwise degrade reception of signals via beams of the second beam group.

The base station may transmit the CMR configurations periodically, aperiodically, and/or in connection with semi-persistent scheduling. For example, the CMR configurations may be periodically transmitted CMR configurations, aperiodically transmitted CMR configurations, and/or semi-persistent scheduling-based CMR configurations, among other examples.

As shown by reference number 425, the UE may determine that the first set of reference signals are associated with the first beam group and that the second set of reference signals are associated with the second beam group. In some aspects, the UE may determine that the first set of reference signals are associated with the first beam group and that the second set of reference signals are associated with the second beam group based at least in part on explicit indications within the CMR configurations that the first set of reference signals are associated with the first beam group, or implicit indications within the CMR configurations that the first set of reference signals are associated with the first beam group.

In some aspects, the implicit indications within the CMR configurations comprise CORESET pool identifications associated with TCI states of the first set of reference signals and the second set of reference signals, BFD-RS sets associated with CRIs that are associated with the first set of reference signals and the second set of reference signals, or NBI-RSs associated with CRIs that are associated with the first set of reference signals and the second set of reference signals. In some aspects, the CORESET pool identifications, the BFD-RS sets and/or the NBI-RSs may be associated with the TCI states (e.g., that are associated with the beam groups) based at least in part on signaling within the CMR communications, a communication protocol, and/or other configuration information, among other examples.

As shown by reference number 430, the UE may receive, and the base station may transmit, the first set of reference signals and the second set of reference signals. In some aspects, the UE may receive one or more reference signals of the first set of reference signals and/or the second set of reference signals via simultaneous reception (e.g., using one or more antenna groups). In some aspects, the UE may receive one or more reference signals of the first set of reference signals and/or the second set of reference signals via time division multiplexing.

As shown by reference number 435, the UE may determine one or more sets of beams that include a first beam of the first beam group and a second beam of the second beam group. For example, a set of beams may include only one beam from the first beam group and only one beam from the second beam group. In some aspects, the set of beams may also include only one beam from a third beam group and/or only one beam from a fourth beam group, among other examples. In some aspects, the set of beams may include only beams from different beam groups such that no two beams of the set of beams are from a same beam group. In some aspects, the set of beams is a pair of beams, with each beam in the pair of beams being from a different beam group.

As shown by reference number 440, the UE may determine a number of one or more sets of beams to report in the CSI report. In some aspects, the number of the one or more sets of beams to report in the CSI report is based at least in part on an indication from a base station to transmit the number of one or more sets of beams and/or a number of the one or more sets of beams that satisfy one or more quality metrics. For example, the base station may indicate a number of the one or more sets of beams and the UE must report the number of the one or more sets of beams. Alternatively, the UE may receive an indication of the number of the one or more sets of beams, and the UE may determine to report a number of sets of beams that is less than or equal to the number indicated by the base station. The UE may determine to report the number of sets of beams based at least in part on the indication from the base station and/or the number of sets of beams satisfying one or more quality metrics (e.g., an RSRP and/or SINR threshold).

In some aspects, the UE may indicate the number of sets of beams based at least in part on an indication of the number of the one or more additional sets of beams within a field of CSI report, use of a reserved index in a beam group identification field of the CSI report, and/or indications, within front-loaded bits for respective beam group identification fields, of whether beam group identification fields include an additional set of beams, among other examples.

In some aspects, the UE may generate a CSI report to indicate the one or more sets of beams. In some aspects, the CSI report may include one or more indices to indicate beams of the one or more sets of beams and/or one or more quality metrics associated with the beams.

As shown by reference number 445, the UE may transmit, and the base station may receive, the CSI report. In some aspects, the CSI report indicates the one or more sets of beams. In some aspects, the CSI report may include, for a set of beams, an indication of the first beam, one or more metrics associated with the first beam, an indication of the second beam, and one or more metrics associated with the second beam. In some aspects, the set of beams includes a third beam and/or a fourth beam, and the CSI report includes an indication of the third beam, one or more metrics associated with the third beam, an indication of the fourth beam, and one or more metrics associated with the fourth beam.

In some aspects, the CSI report includes an indication of the first beam based at least in part on indexing within the first beam group and an indication of the second beam based at least in part on indexing within the second beam group. Based at least in part on the first beam group having a different size form the second beam group (e.g., having a different number of beams in the beam groups), the UE may be configured to indicate the beams using the same or different bitwidths. For example, the CSI report may include an indication of a first beam and a second beam with a bitwidth that is based at least in part on a greater one of the number of beams in the first beam group and the number of beams in the second beam group (e.g., a bitwidth large enough to include indices for each beam in the larger of the first beam group or the second beam group). Alternatively, the CSI report may include an indication of a first beam with a first bitwidth that is based at least in part on a number of beams in the first beam group and may include an indication of a second beam with a second bitwidth that is based at least in part on a number of beams in the second beam group. In other words, bitwidths for beams in different beam groups may be different.

As shown by reference number 450, the base station may select a set of beams for subsequent communications with the UE. In some aspects, the base station may use a preferred set of beams for communicating with the UE. For example, the base station may select a set of beams having highest quality metrics. In some aspects, the base station may select a set of beams based at least in part on scheduling metrics associated with traffic for other UEs in a cell provided by the base station.

As shown by reference number 455, the UE may receive, and the base station may transmit, an indication of the set of beams for the subsequent communications. In some aspects, the base station may indicate the set of beams via an index that indicates the set of beams from the one or more sets of beams indicated in the CSI report. In some aspects, the base station may indicate the set of beams via individual TCI states.

Based at least in part on the UE transmitting a CSI report that indicates one or more sets of beams with each beam within a set of beams being associated with a different beam group, the CSI report may indicate one or more sets of beams that includes beams with spatial diversity, which may reduce interference among beams within a set of beams. The reduced interference among beams within the set of beams may reduce reception errors, which may conserve power, computing, network, and/or communication resources that the UE and/or the base station may have otherwise used to detect and/or correct the reception errors. Additionally, or alternatively, the UE may receive the downlink communications with parameters (e.g., an MCS) that cause improved spectral efficiency than if the multiple preferred beams were associated with different TRPs having reduced spatial diversity.

As indicated above, FIG. 4 is provided as an example. Other examples may differ from what is described with respect to FIG. 4.

Figure 5:
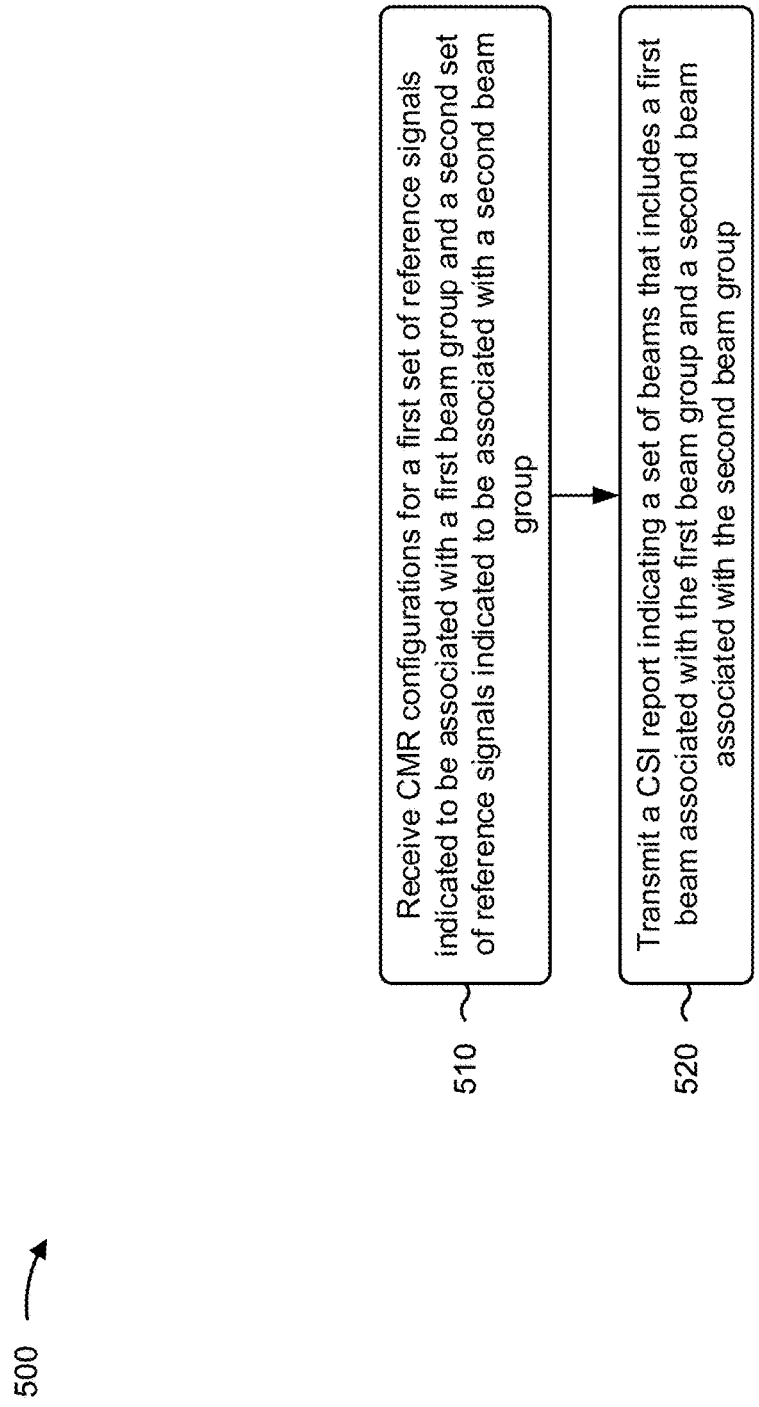
FIGS. 5 and 6 are diagrams illustrating example processes associated with beam group based channel state information reporting, in accordance with the present disclosure.

FIG. 5 is a diagram illustrating an example process 500 performed, for example, by a UE, in accordance with the present disclosure. Example process 500 is an example where the UE (e.g., UE 120) performs operations associated with beam group based CSI reporting.

As shown in FIG. 5, in some aspects, process 500 may include receiving CMR configurations for a first set of reference signals indicated to be associated with a first beam group and a second set of reference signals indicated to be associated with a second beam group (block 510). For example, the UE (e.g., using communication manager 140 and/or reception component 702, depicted in FIG. 7) may receive CMR configurations for a first set of reference signals indicated to be associated with a first beam group and a second set of reference signals indicated to be associated with a second beam group, as described above.

As further shown in FIG. 5, in some aspects, process 500 may include transmitting a CSI report indicating a set of beams that includes a first beam associated with the first beam group and a second beam associated with the second beam group (block 520). For example, the UE (e.g., using communication manager 140 and/or transmission component 704, depicted in FIG. 7) may transmit a CSI report indicating a set of beams that includes a first beam associated with the first beam group and a second beam associated with the second beam group, as described above.

Process 500 may include additional aspects, such as any single aspect or any combination of aspects described below and/or in connection with one or more other processes described elsewhere herein.

In a first aspect, process 500 includes receiving the first set of reference signals and the second set of reference signals.

In a second aspect, alone or in combination with the first aspect, the first beam group is associated with a first TRP and the second beam group is associated with a second TRP.

In a third aspect, alone or in combination with one or more of the first and second aspects, the set of beams comprises a pair of beams, with each beam in the pair of beams being from a different beam group.

In a fourth aspect, alone or in combination with one or more of the first through third aspects, the set of beams comprises only one beam from the first beam group and only one beam from the second beam group.

In a fifth aspect, alone or in combination with one or more of the first through fourth aspects, the CSI report comprises an indication of the first beam, one or more first metrics associated with the first beam, an indication of the second beam, and one or more second metrics associated with the second beam.

In a sixth aspect, alone or in combination with one or more of the first through fifth aspects, the CSI report comprises an indication of the first beam based at least in part on indexing within the first beam group, and an indication of the second beam based at least in part on indexing within the second beam group.

In a seventh aspect, alone or in combination with one or more of the first through sixth aspects, the first beam group has a different size as the second beam group, and wherein a first bitwidth of the indication of the first beam and a second bitwidth of the indication of the first beam are based at least in part on a number of beams in the first beam group and a number of beams in the second beam group, respectively, or a greater of the number of beams in the first beam group and the number of beams in the second beam group.

In an eighth aspect, alone or in combination with one or more of the first through seventh aspects, the first set of reference signals is indicated to be associated with a first beam group based at least in part on one or more of explicit indications within the CMR configurations that the first set of reference signals are associated with the first beam group, or implicit indications within the CMR configurations that the first set of reference signals are associated with the first beam group.

In a ninth aspect, alone or in combination with one or more of the first through eighth aspects, the implicit indications within the CMR configurations comprise one or more of controlling resource set pool identifications associated with transmission configuration indicator states of the first set of reference signals and the second set of reference signals, beaming failure detection reference signal sets associated with CSI resource indicators that are associated with the first set of reference signals and the second set of reference signals, or NBI-RSs associated with CSI resource indicators that are associated with the first set of reference signals and the second set of reference signals.

In a tenth aspect, alone or in combination with one or more of the first through ninth aspects, receiving the CMR configurations comprises receiving the CMR configurations as one or more of periodically transmitting CMR configurations, aperiodically transmitting CMR configurations, or semi-persistent scheduling-based CMR configurations.

In an eleventh aspect, alone or in combination with one or more of the first through tenth aspects, the CSI report indicates one or more additional sets of beams, and wherein a number of the one or more additional sets of beams is based at least in part on one or more of an indication from a base station to transmit the number of the one or more additional sets of beams, or a number of the one or more additional sets of beams that satisfy one or more quality metrics.

In a twelfth aspect, alone or in combination with one or more of the first through eleventh aspects, process 500 includes transmitting an indication of a number of sets of beams that the UE supports reporting in the CSI report, wherein the number of the one or more additional sets of beams is based at least in part on the indication of the number of sets of beams that the UE supports reporting in the CSI report.

In a thirteenth aspect, alone or in combination with one or more of the first through twelfth aspects, a number of the one or more additional sets of beams is based at least in part on the one or more additional sets of beams satisfying one or more quality metrics, and wherein the CSI report indicates the number of the one or more additional sets of beams based at least in part on an indication of the number of the one or more additional sets of beams within a field of CSI report, using of a reserved index in a beam group identification field of the CSI report, or indications, within front-loaded bits for respective beam group identification fields, of whether beam group identification fields include an additional set of beams.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
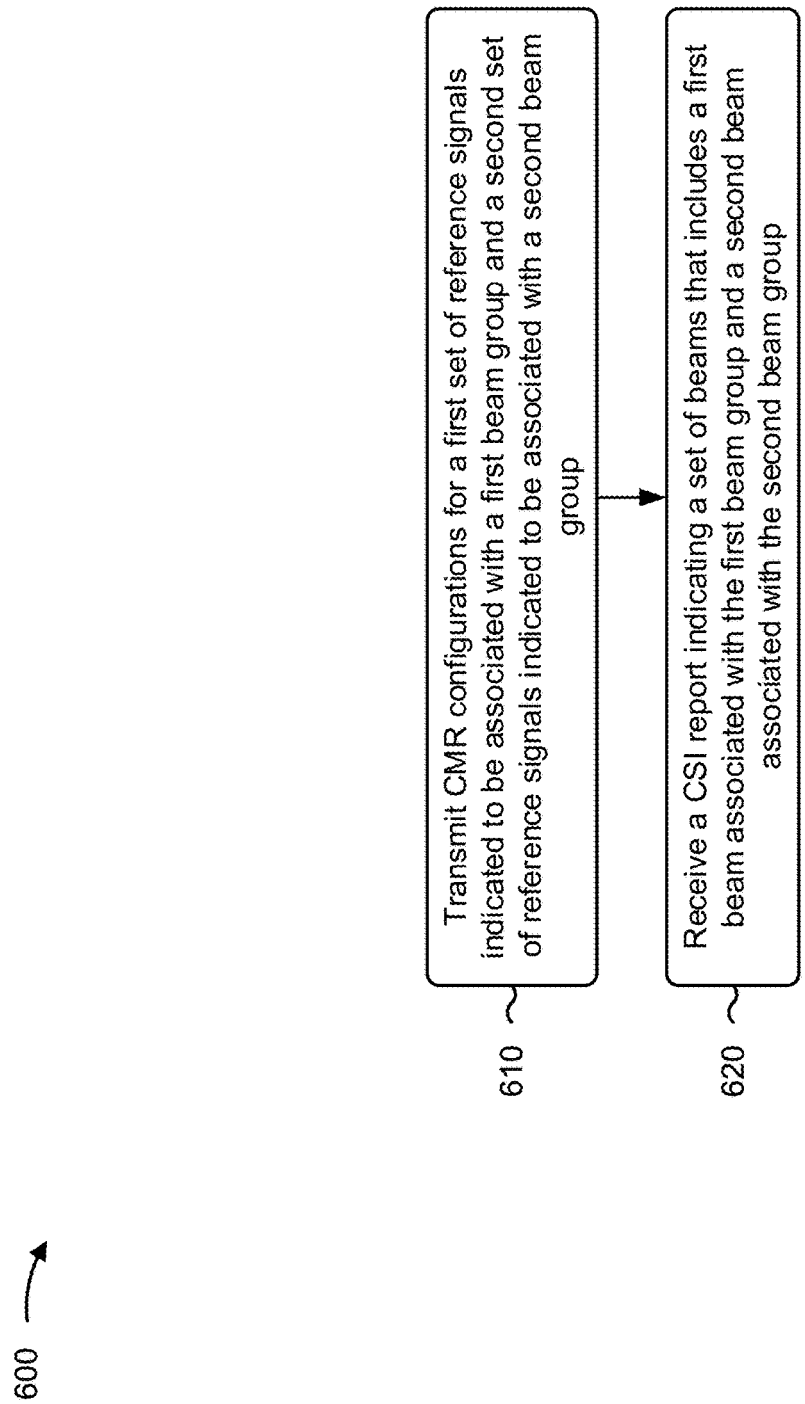

FIG. 6 is a diagram illustrating an example process 600 performed, for example, by a base station, in accordance with the present disclosure. Example process 600 is an example where the base station (e.g., base station 110) performs operations associated with beam group based CSI reporting.

As shown in FIG. 6, in some aspects, process 600 may include transmitting CMR configurations for a first set of reference signals indicated to be associated with a first beam group and a second set of reference signals indicated to be associated with a second beam group (block 610). For example, the base station (e.g., using communication manager 150 and/or transmission component 804, depicted in FIG. 8) may transmit CMR configurations for a first set of reference signals indicated to be associated with a first beam group and a second set of reference signals indicated to be associated with a second beam group, as described above.

As further shown in FIG. 6, in some aspects, process 600 may include receiving a CSI report indicating a set of beams that includes a first beam associated with the first beam group and a second beam associated with the second beam group (block 620). For example, the base station (e.g., using communication manager 150 and/or reception component 802, depicted in FIG. 8) may receive a CSI report indicating a set of beams that includes a first beam associated with the first beam group and a second beam associated with the second beam group, as described above.

Process 600 may include additional aspects, such as any single aspect or any combination of aspects described below and/or in connection with one or more other processes described elsewhere herein.

In a first aspect, process 600 includes transmitting the first set of reference signals and the second set of reference signals.

In a second aspect, alone or in combination with the first aspect, the first beam group is associated with a first TRP and the second beam group is associated with a second TRP.

In a third aspect, alone or in combination with one or more of the first and second aspects, the set of beams comprises a pair of beams, with each beam in the pair of beams being from a different beam group.

In a fourth aspect, alone or in combination with one or more of the first through third aspects, the set of beams comprises only one beam from the first beam group and only one beam from the second beam group.

In a fifth aspect, alone or in combination with one or more of the first through fourth aspects, the CSI report comprises an indication of the first beam, one or more first metrics associated with the first beam, an indication of the second beam, and one or more second metrics associated with the second beam.

In a sixth aspect, alone or in combination with one or more of the first through fifth aspects, the CSI report comprises an indication of the first beam based at least in part on indexing within the first beam group, and an indication of the second beam based at least in part on indexing within the second beam group.

In a seventh aspect, alone or in combination with one or more of the first through sixth aspects, the first beam group has a different size as the second beam group, and wherein a first bitwidth of the indication of the first beam and a second bitwidth of the indication of the first beam are based at least in part on a number of beams in the first beam group and a number of beams in the second beam group, respectively, or a greater of the number of beams in the first beam group and the number of beams in the second beam group.

In an eighth aspect, alone or in combination with one or more of the first through seventh aspects, the first set of reference signals is indicated to be associated with a first beam group based at least in part on one or more of explicit indications within the CMR configurations that the first set of reference signals are associated with the first beam group, or implicit indications within the CMR configurations that the first set of reference signals are associated with the first beam group.

In a ninth aspect, alone or in combination with one or more of the first through eighth aspects, the implicit indications within the CMR configurations comprise one or more of controlling resource set pool identifications associated with transmission configuration indicator states of the first set of reference signals and the second set of reference signals, beaming failure detection reference signal sets associated with CSI resource indicators that are associated with the first set of reference signals and the second set of reference signals, or NBI-RSs associated with CSI resource indicators that are associated with the first set of reference signals and the second set of reference signals.

In a tenth aspect, alone or in combination with one or more of the first through ninth aspects, receiving the CMR configurations comprises receiving the CMR configurations as one or more of periodically transmitting CMR configurations, aperiodically transmitting CMR configurations, or semi-persistent scheduling-based CMR configurations.

In an eleventh aspect, alone or in combination with one or more of the first through tenth aspects, the CSI report indicates one or more additional sets of beams, and wherein a number of the one or more additional sets of beams is based at least in part on one or more of an indication from a base station to transmit the number of the one or more additional sets of beams, or a number of the one or more additional sets of beams that satisfy one or more quality metrics.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
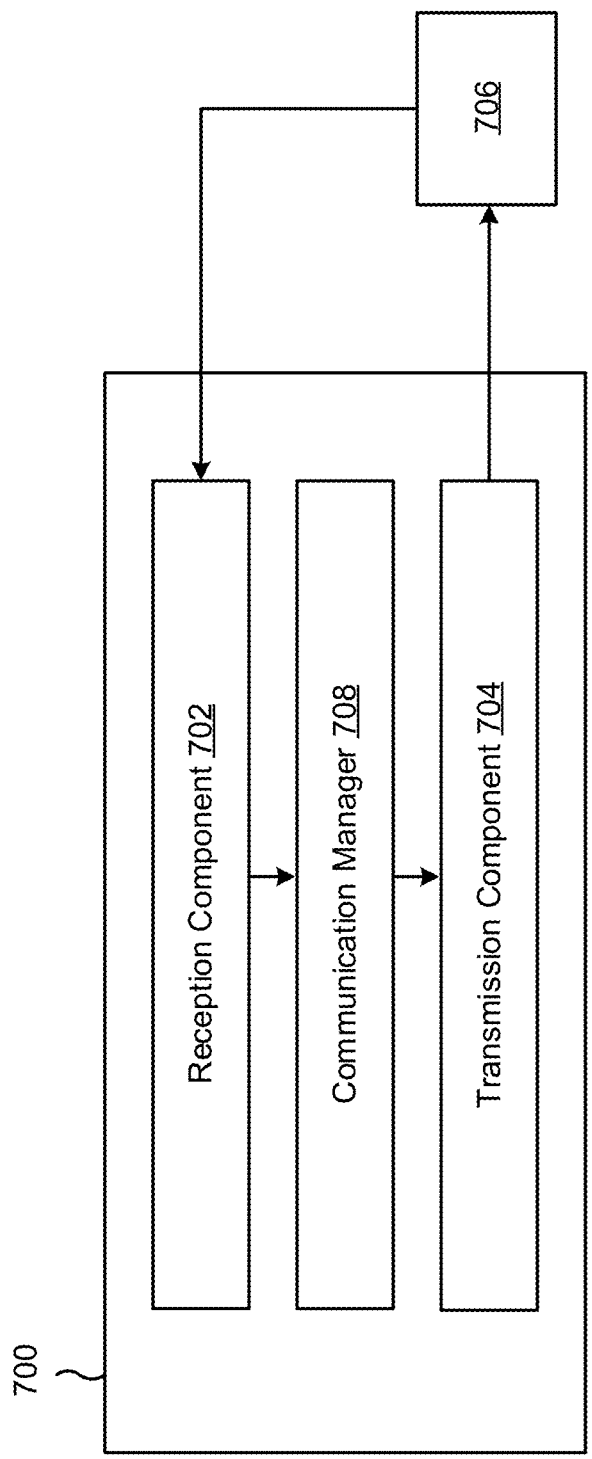
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708 (e.g., communication manager 140).

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive CMR configurations for a first set of reference signals indicated to be associated with a first beam group and a second set of reference signals indicated to be associated with a second beam group. The transmission component 704 may transmit a CSI report indicating a set of beams that includes a first beam associated with the first beam group and a second beam associated with the second beam group.

The reception component 702 may receive the first set of reference signals and the second set of reference signals.

The transmission component 704 may transmit an indication of a number of sets of beams that the UE supports reporting in the CSI report wherein the number of the one or more additional sets of beams is based at least in part on the indication of the number of sets of beams that the UE supports reporting in the CSI report.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
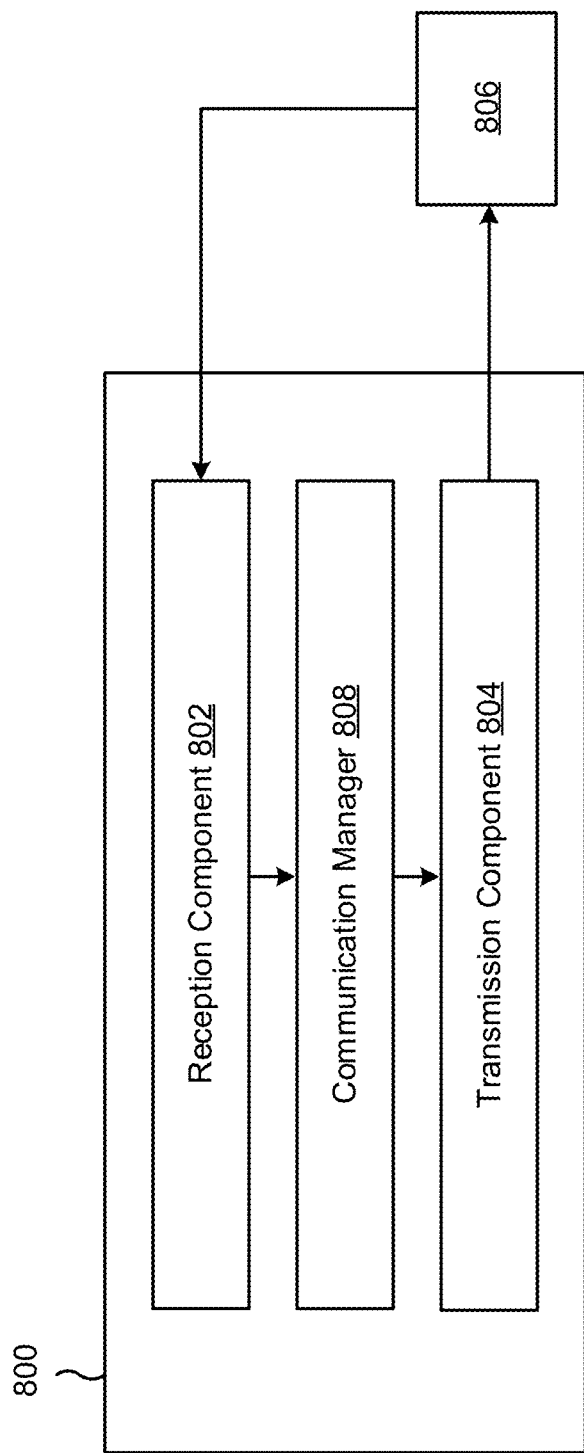

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (e.g., communication manager 150).

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit CMR configurations for a first set of reference signals indicated to be associated with a first beam group and a second set of reference signals indicated to be associated with a second beam group. The reception component 802 may receive a CSI report indicating a set of beams that includes a first beam associated with the first beam group and a second beam associated with the second beam group.

The transmission component 804 may transmit the first set of reference signals and the second set of reference signals.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving channel state information (CSI) measurement resource (CMR) configurations for a first set of reference signals indicated to be associated with a first beam group and a second set of reference signals indicated to be associated with a second beam group; and transmitting a CSI report indicating a set of beams that includes a first beam associated with the first beam group and a second beam associated with the second beam group.

Aspect 2: The method of Aspect 1, further comprising: receiving the first set of reference signals and the second set of reference signals.

Aspect 3: The method of any of Aspects 1-2, wherein the first beam group is associated with a first transmission and reception point (TRP) and the second beam group is associated with a second TRP.

Aspect 4: The method of any of Aspects 1-3, wherein the set of beams comprises a pair of beams, with each beam in the pair of beams being from a different beam group.

Aspect 5: The method of any of Aspects 1-4, wherein the set of beams comprises only one beam from the first beam group and only one beam from the second beam group.

Aspect 6: The method of any of Aspects 1-5, wherein the CSI report comprises: an indication of the first beam, one or more first metrics associated with the first beam, an indication of the second beam, and one or more second metrics associated with the second beam.

Aspect 7: The method of any of Aspects 1-6, wherein the CSI report comprises: an indication of the first beam based at least in part on indexing within the first beam group, and an indication of the second beam based at least in part on indexing within the second beam group.

Aspect 8: The method of Aspect 7, wherein the first beam group has a different size as the second beam group, and wherein a first bitwidth of the indication of the first beam and a second bitwidth of the indication of the first beam are based at least in part on: a number of beams in the first beam group and a number of beams in the second beam group, respectively, or a greater of the number of beams in the first beam group and the number of beams in the second beam group.

Aspect 9: The method of any of Aspects 1-8, wherein the first set of reference signals is indicated to be associated with a first beam group based at least in part on one or more of: explicit indications within the CMR configurations that the first set of reference signals are associated with the first beam group, or implicit indications within the CMR configurations that the first set of reference signals are associated with the first beam group.

Aspect 10: The method of Aspect 9, wherein the implicit indications within the CMR configurations comprise one or more of: control resource set pool identifications associated with transmission configuration indicator states of the first set of reference signals and the second set of reference signals, beam failure detection reference signal sets associated with CSI resource indicators that are associated with the first set of reference signals and the second set of reference signals, or new beam identification reference signals associated with CSI resource indicators that are associated with the first set of reference signals and the second set of reference signals.

Aspect 11: The method of any of Aspects 1-10, wherein receiving the CMR configurations comprises receiving the CMR configurations as one or more of: periodically transmitted CMR configurations, aperiodically transmitted CMR configurations, or semi-persistent scheduling-based CMR configurations.

Aspect 12: The method of any of Aspects 1-11, wherein the CSI report indicates one or more additional sets of beams, and wherein a number of the one or more additional sets of beams is based at least in part on one or more of: an indication from a base station to transmit the number of the one or more additional sets of beams, or a number of the one or more additional sets of beams that satisfy one or more quality metrics.

Aspect 13: The method of Aspect 12, further comprising: transmitting an indication of a number of sets of beams that the UE supports reporting in the CSI report, wherein the number of the one or more additional sets of beams is based at least in part on the indication of the number of sets of beams that the UE supports reporting in the CSI report.

Aspect 14: The method of any of Aspects 1-13, wherein a number of the one or more additional sets of beams is based at least in part on the one or more additional sets of beams satisfying one or more quality metrics, and wherein the CSI report indicates the number of the one or more additional sets of beams based at least in part on: an indication of the number of the one or more additional sets of beams within a field of CSI report, use of a reserved index in a beam group identification field of the CSI report, or indications, within front-loaded bits for respective beam group identification fields, of whether beam group identification fields include an additional set of beams.

Aspect 15: A method of wireless communication performed by a base station, comprising: transmitting channel state information (CSI) measurement resource (CMR) configurations for a first set of reference signals indicated to be associated with a first beam group and a second set of reference signals indicated to be associated with a second beam group; and receiving a CSI report indicating a set of beams that includes a first beam associated with the first beam group and a second beam associated with the second beam group.

Aspect 16: The method of Aspect 15, further comprising: transmitting the first set of reference signals and the second set of reference signals.

Aspect 17: The method of any of Aspects 15-16, wherein the first beam group is associated with a first transmission and reception point (TRP) and the second beam group is associated with a second TRP.

Aspect 18: The method of any of Aspects 15-17, wherein the set of beams comprises a pair of beams, with each beam in the pair of beams being from a different beam group.

Aspect 19: The method of any of Aspects 15-18, wherein the set of beams comprises only one beam from the first beam group and only one beam from the second beam group.

Aspect 20: The method of any of Aspects 15-19, wherein the CSI report comprises: an indication of the first beam, one or more first metrics associated with the first beam, an indication of the second beam, and one or more second metrics associated with the second beam.

Aspect 21: The method of any of Aspects 15-20, wherein the CSI report comprises: an indication of the first beam based at least in part on indexing within the first beam group, and an indication of the second beam based at least in part on indexing within the second beam group.

Aspect 22: The method of Aspect 21, wherein the first beam group has a different size as the second beam group, and wherein a first bitwidth of the indication of the first beam and a second bitwidth of the indication of the first beam are based at least in part on: a number of beams in the first beam group and a number of beams in the second beam group, respectively, or a greater of the number of beams in the first beam group and the number of beams in the second beam group.

Aspect 23: The method of any of Aspects 15-22, wherein the first set of reference signals is indicated to be associated with a first beam group based at least in part on one or more of: explicit indications within the CMR configurations that the first set of reference signals are associated with the first beam group, or implicit indications within the CMR configurations that the first set of reference signals are associated with the first beam group.

Aspect 24: The method of Aspect 23, wherein the implicit indications within the CMR configurations comprise one or more of: control resource set pool identifications associated with transmission configuration indicator states of the first set of reference signals and the second set of reference signals, beam failure detection reference signal sets associated with CSI resource indicators that are associated with the first set of reference signals and the second set of reference signals, or new beam identification reference signals associated with CSI resource indicators that are associated with the first set of reference signals and the second set of reference signals.

Aspect 25: The method of any of Aspects 15-24, wherein receiving the CMR configurations comprises receiving the CMR configurations as one or more of: periodically transmitted CMR configurations, aperiodically transmitted CMR configurations, or semi-persistent scheduling-based CMR configurations.

Aspect 26: The method of any of Aspects 15-25, wherein the CSI report indicates one or more additional sets of beams, and wherein a number of the one or more additional sets of beams is based at least in part on one or more of: an indication from a base station to transmit the number of the one or more additional sets of beams, or a number of the one or more additional sets of beams that satisfy one or more quality metrics.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      transmit, based at least in part on receiving configuration information associated with channel state information (CSI) measurement resource (CMR) configurations, an indication of a UE capability of a quantity of sets of beams that the UE supports for reporting in a CSI report, wherein each set of beams includes multiple downlink beams that are each from a different beam group;
      receive, after transmitting the indication of the UE capability, CMR configurations for a first set of reference signals indicated to be associated with a first beam group and a second set of reference signals indicated to be associated with a second beam group; and
      transmit, after receiving the CMR configurations, a CSI report indicating a set of beams, associated with the quantity of sets of beams, that includes a first beam associated with the first beam group and a second beam associated with the second beam group, the CSI report being based at least in part on the quantity of sets of beams that the UE supports.

2. The UE of claim 1, wherein the one or more processors are further configured to:
   receive the first set of reference signals and the second set of reference signals.

3. The UE of claim 1, wherein the first beam group is associated with a first transmission and reception point (TRP) and the second beam group is associated with a second TRP.

4. The UE of claim 1, wherein the set of beams comprises a pair of beams, with each beam in the pair of beams being from a different beam group.

5. The UE of claim 1, wherein the set of beams comprises only one beam from the first beam group and only one beam from the second beam group.

6. The UE of claim 1, wherein the CSI report comprises:
   an indication of the first beam,
   one or more first metrics associated with the first beam,
   an indication of the second beam, and
   one or more second metrics associated with the second beam.

7. The UE of claim 1, wherein the CSI report comprises:
   an indication of the first beam based at least in part on indexing within the first beam group, and
   an indication of the second beam based at least in part on indexing within the second beam group.

8. The UE of claim 7, wherein the first beam group has a different size than the second beam group, and
   wherein a first bitwidth of the indication of the first beam and a second bitwidth of the indication of the second beam are based at least in part on:
      a quantity of beams in the first beam group and a quantity of beams in the second beam group, respectively, or
      a greater of the quantity of beams in the first beam group and the quantity of beams in the second beam group.

9. The UE of claim 1, wherein the first set of reference signals is indicated to be associated with the first beam group based at least in part on one or more of:
explicit indications within the CMR configurations that the first set of reference signals are associated with the first beam group, or
implicit indications within the CMR configurations that the first set of reference signals are associated with the first beam group.

10. The UE of claim 9, wherein the implicit indications within the CMR configurations comprise one or more of:
control resource set pool identifications associated with transmission configuration indicator states of the first set of reference signals and the second set of reference signals,
beam failure detection reference signal sets associated with CSI resource indicators that are associated with the first set of reference signals and the second set of reference signals, or
new beam identification reference signals associated with CSI resource indicators that are associated with the first set of reference signals and the second set of reference signals.

11. The UE of claim 1, wherein the one or more processors, to receive the CMR configurations, are configured to receive the CMR configurations as one or more of:
periodically transmitted CMR configurations,
aperiodically transmitted CMR configurations, or
semi-persistent scheduling-based CMR configurations.

12. The UE of claim 1, wherein the CSI report indicates one or more additional sets of beams, and
wherein a quantity of the one or more additional sets of beams is based at least in part on one or more of:
an indication from a network entity to transmit the quantity of the one or more additional sets of beams, or
a quantity of the one or more additional sets of beams that satisfy one or more quality metrics.

13. The UE of claim 12, wherein the quantity of the one or more additional sets of beams is based at least in part on the indication of the quantity of sets of beams that the UE supports for reporting in a CSI report.

14. The UE of claim 1, wherein a quantity of one or more additional sets of beams is based at least in part on the one or more additional sets of beams satisfying one or more quality metrics, and
wherein the CSI report indicates the quantity of the one or more additional sets of beams based at least in part on:
an indication of the quantity of the one or more additional sets of beams within a field of CSI report,
use of a reserved index in a beam group identification field of the CSI report, or
indications, within front-loaded bits for respective beam group identification fields, of whether beam group identification fields include an additional set of beams.

15. A network entity for wireless communication, comprising:
one or more memories; and
one or more processors, coupled to the one or more memories, configured to:
receive, based at least in part on transmitting configuration information associated with channel state information (CSI) measurement resource (CMR) configurations, an indication of a capability of a quantity of sets of beams that a user equipment (UE) supports for reporting in a CSI report, wherein each set of beams includes multiple downlink beams that are each from a different beam group;
transmit, after receiving the indication of the capability, CMR configurations for a first set of reference signals indicated to be associated with a first beam group and a second set of reference signals indicated to be associated with a second beam group; and
receive, after transmitting the CMR configurations, a CSI report indicating a set of beams, associated with the quantity of sets of beams, that includes a first beam associated with the first beam group and a second beam associated with the second beam group, the CSI report being based at least in part on the quantity of sets of beams that the UE supports.

16. The network entity of claim 15, wherein the one or more processors are further configured to:
transmit the first set of reference signals and the second set of reference signals.

17. The network entity of claim 15, wherein the first beam group is associated with a first transmission and reception point (TRP) and the second beam group is associated with a second TRP.

18. The network entity of claim 15, wherein the set of beams comprises a pair of beams, with each beam in the pair of beams being from a different beam group.

19. The network entity of claim 15, wherein the set of beams comprises only one beam from the first beam group and only one beam from the second beam group.

20. The network entity of claim 15, wherein the CSI report comprises:
an indication of the first beam,
one or more first metrics associated with the first beam,
an indication of the second beam, and
one or more second metrics associated with the second beam.

21. The network entity of claim 15, wherein the CSI report comprises:
an indication of the first beam based at least in part on indexing within the first beam group, and
an indication of the second beam based at least in part on indexing within the second beam group.

22. The network entity of claim 21, wherein the first beam group has a different size than the second beam group, and
wherein a first bitwidth of the indication of the first beam and a second bitwidth of the indication of the second beam are based at least in part on:
a quantity of beams in the first beam group and a quantity of beams in the second beam group, respectively, or
a greater of the quantity of beams in the first beam group and the quantity of beams in the second beam group.

23. The network entity of claim 15, wherein the first set of reference signals is indicated to be associated with the first beam group based at least in part on one or more of:
explicit indications within the CMR configurations that the first set of reference signals are associated with the first beam group, or
implicit indications within the CMR configurations that the first set of reference signals are associated with the first beam group.

24. The network entity of claim 23, wherein the implicit indications within the CMR configurations comprise one or more of:

control resource set pool identifications associated with transmission configuration indicator states of the first set of reference signals and the second set of reference signals, beam failure detection reference signal sets associated with CSI resource indicators that are associated with the first set of reference signals and the second set of reference signals, or new beam identification reference signals associated with CSI resource indicators that are associated with the first set of reference signals and the second set of reference signals.

25. The network entity of claim 15, wherein the one or more processors, to receive the CMR configurations, are configured to receive the CMR configurations as one or more of:

periodically transmitted CMR configurations, a periodically transmitted CMR configurations, or semi-persistent scheduling-based CMR configurations.

26. The network entity of claim 15, wherein the CSI report indicates one or more additional sets of beams, and wherein a quantity of the one or more additional sets of beams is based at least in part on one or more of:

an indication to transmit the quantity of the one or more additional sets of beams, or a quantity of the one or more additional sets of beams that satisfy one or more quality metrics.

27. A method of wireless communication performed by a user equipment (UE), comprising:

transmitting, based at least in part on receiving configuration information associated with channel state information (CSI) measurement resource (CMR) configurations, an indication of a UE capability of a quantity of sets of beams that the UE supports for reporting in a CSI report, wherein each set of beams includes multiple downlink beams that are each from a different beam group;

receiving, after transmitting the indication of the UE capability, CMR configurations for a first set of reference signals indicated to be associated with a first beam group and a second set of reference signals indicated to be associated with a second beam group; and transmitting, after receiving the CMR configurations, a CSI report indicating a set of beams, associated with the quantity of sets of beams, that includes a first beam associated with the first beam group and a second beam associated with the second beam group, the CSI report being based at least in part on the quantity of sets of beams that the UE supports.

28. The method of claim 27, wherein the set of beams comprises only one beam from the first beam group and only one beam from the second beam group.

29. A method of wireless communication performed by a network entity, comprising:

receiving, based at least in part on transmitting configuration information associated with channel state information (CSI) measurement resource (CMR) configurations, an indication of a capability of a quantity of sets of beams that a user equipment (UE) supports for reporting in a CSI report, wherein each set of beams includes multiple downlink beams that are each from a different beam group;

transmitting, after receiving the indication of the capability, CMR configurations for a first set of reference signals indicated to be associated with a first beam group and a second set of reference signals indicated to be associated with a second beam group; and receiving, after transmitting the CMR configurations, a CSI report indicating a set of beams, associated with the quantity of sets of beams, that includes a first beam associated with the first beam group and a second beam associated with the second beam group, the CSI report being based at least in part on the quantity of sets of beams that the UE supports.

30. The method of claim 29, wherein the set of beams comprises only one beam from the first beam group and only one beam from the second beam group.

* * * * *